(12) United States Patent
Boecker et al.

(10) Patent No.: US 12,208,560 B2
(45) Date of Patent: Jan. 28, 2025

(54) ARRANGEMENT FOR THE TRANSPORT OF MEDIA

(71) Applicant: TI Automotive Technology Center GmbH, Rastatt (DE)

(72) Inventors: Albert Boecker, Ettlingen (DE);
Matthias Winter, Rastatt (DE);
Thorsten Schaefer, Steinfeld (DE);
Florian Deibel, Sinzheim (DE); Artem Tuzin, Stutensee (DE)

(73) Assignee: TI AUTOMOTIVE TECHNOLOGY CENTER GMBH, Rastatt (DE)

( * ) Notice: Subject to any disclaimer, the term of this patent is extended or adjusted under 35 U.S.C. 154(b) by 0 days.

(21) Appl. No.: 17/702,058

(22) Filed: Mar. 23, 2022

(65) Prior Publication Data

US 2022/0314521 A1 Oct. 6, 2022

(30) Foreign Application Priority Data

Mar. 31, 2021 (EP) ..................................... 21166246

(51) Int. Cl.
*B29C 49/42* (2006.01)
*F16L 47/32* (2006.01)
*B29L 31/00* (2006.01)

(52) U.S. Cl.
CPC .............. *B29C 49/42* (2013.01); *F16L 47/32* (2013.01); *B29L 2031/7496* (2013.01); *B29L 2031/7506* (2013.01)

(58) Field of Classification Search
CPC .......... F16L 47/26; F16L 47/32; B29C 49/00; B29C 49/20; B29C 49/42; B29C 49/48

USPC ......... 285/124.1–124.5, 125.1, 126.1, 129.1, 285/129.2, 130.1, 131.1, 132.1
See application file for complete search history.

(56) References Cited

U.S. PATENT DOCUMENTS

| | | | | |
|---|---|---|---|---|
| 4,765,507 | A * | 8/1988 | Yavorsky | F17C 1/16 220/661 |
| 5,104,472 | A | 4/1992 | Kasugai et al. | |
| 6,425,502 | B1 * | 7/2002 | Rauworth | B67D 7/76 137/212 |
| 2004/0090088 | A1 * | 5/2004 | Reed | B60H 1/00564 296/208 |
| 2015/0239198 | A1 * | 8/2015 | Iwata | B60K 15/03177 138/109 |
| 2016/0250796 | A1 * | 9/2016 | Coing | B29C 49/20 220/562 |

FOREIGN PATENT DOCUMENTS

| | | | | |
|---|---|---|---|---|
| CA | 2641463 A1 * | 8/2007 | ......... | B29C 37/0085 |
| DE | 102006006469 A1 | 8/2007 | | |
| JP | H01316244 A | 12/1989 | | |
| JP | H0352372 U | 5/1991 | | |

OTHER PUBLICATIONS

International Search Report dated Jun. 16, 2021.

* cited by examiner

*Primary Examiner* — James M Hewitt, II
(74) *Attorney, Agent, or Firm* — Dickinson Wright PLLC

(57) ABSTRACT

An Arrangement for transporting media, comprising a base body formed as a blow-molded part and at least one functional element, wherein the functional element is positively fixed to the base body, wherein the positive fit is formed by shaping the base body during blow molding, and a method for producing an arrangement.

13 Claims, 5 Drawing Sheets

ARRANGEMENT FOR THE TRANSPORT OF MEDIA

RELATED APPLICATIONS

The present disclosure is a national phase application of European Application 21166246.5, filed on Mar. 31, 2021, the entire contents of which is incorporated herein by reference.

FIELD

The disclosure relates to an arrangement for the transport of media, comprising a base body formed as a blow-molded part and at least one functional element.

BACKGROUND

Arrangements for the transport of media are needed, for example, in electromobility. Electric vehicle batteries, especially lithium-ion batteries, show an optimal performance only within a limited temperature spectrum. Depending on the ambient temperature, it may therefore be necessary to heat or cool the batteries. Therefore, the drive unit of an electric vehicle generally has a temperature control circuit with a pipe arrangement through which e.g., temperature control media can be fed to the cells of the battery in order to control their temperature within the desired temperature spectrum.

Furthermore, it may be necessary to temper, in particular to cool, components of the entire drive unit of electric vehicles. In addition to the batteries, this includes the power electronics and the electric motor. The charging electronics and the associated plug connections and cables can also be cooled by means of the temperature control unit. This is particularly relevant in the context of fast charging processes.

In addition to use in a drive unit, there is a further area of application in connection with other vehicle electronics, in particular sensors and on-board computers. If a vehicle is equipped for autonomous driving, powerful sensors and powerful computers are required, wherein the systems are redundantly present in most cases. Due to the fact that the installation space in a vehicle is limited, these systems also have special requirements for a temperature control unit to control the temperature of these components.

Temperature control media are also used in air conditioning systems. Air conditioning systems, in particular mobile air conditioning systems, comprise a pipe arrangement which enables the transport of temperature control media between the individual units of the air conditioning system. In mobile air-conditioning systems, for example in air-conditioning systems for vehicle interiors, the pipe arrangement is a comparatively complex structure. In addition, further components of the arrangement, for example functional elements such as pumps, are to be integrated into the arrangement in a space-saving manner. The integration of functional elements into the arrangement also results in the advantage that the assembly effort of the arrangement is lower. However, it must be ensured, particularly during assembly of the arrangement, that the functional element is held on the arrangement in a loss-proof manner.

BRIEF SUMMARY

The object of the disclosure is to provide an arrangement for the transport of media, which can be manufactured inexpensively and is easy to assemble.

The arrangement for the transport of media according to the disclosure comprises a base body formed as a blow-molded part and at least one functional element, wherein the functional element is positively fixed to the base body, wherein the connection between the base body and at least one functional element is formed by shaping the base body during blow molding.

Accordingly, the arrangement according to the disclosure comprises a base body produced by means of blow molding. Blow molding makes it possible to produce a one-piece base body with a complex shape. For example, the base body can be formed as a manifold for media. The manifold may comprise a plurality of channels which may be shaped, for example curved, in the form required for the mounting location. Furthermore, there is great freedom in the choice of the cross-sectional shape of the channels. The arrangement according to the disclosure is further equipped with at least one functional element which is fixed to the base body. The functional element can be fixed to the base body with a positive fit and/or a substance-to-substance bond. Due to the positive fit, the functional element is fixed to the base body in a captive or loss-proof manner, which makes it particularly easy to assemble the arrangement. Furthermore, the arrangement can be transported particularly easily. In addition, the fact that the positive fit is formed by shaping the base body during blow molding means that the assembly can be produced cost-effectively in high volumes.

In the case of the positive connection, positive locking elements are formed from the base body during shaping in the blow molding process, which engage with the functional element and produce a loss-proof connection, i.e. a fixed, captive or integral connection. For the substance-to-substance bond, the material of the base body can soften or melt under the influence of heat during blow molding and form a substance-to-substance bond with the functional element when the base body bears against the functional element.

Preferably, plastics such as thermoplastic polymers, but also thermoplastic elastomers, are used as the material for the base body. Depending on the pressure conditions in the media transported in the arrangement, the base body can be formed to be single-layered, but also multi-layered.

The base body could form a reservoir for receiving media. Preferably, however, the base body comprises a flow channel through which medium transported by the arrangement can flow. The functional element preferably comprises a further flow channel, wherein there is preferably a flow-conducting connection between the base body and the functional element. In this embodiment, the medium passing through the arrangement flows through the base body and through the functional element. In the process, the base body can distribute the medium. In this sense, the arrangement can form a distribution structure for temperature control medium.

The base body and the functional element are preferably fixed to each other in such a way that a fluid-tight connection is established between the flow channel and the further flow channel. This enables leakage-free transport of temperature control medium.

A seal is preferably arranged between the flow channel of the base body and the flow channel of the functional element. The seal closes the contact area between the base body and the functional element and improves the tightness in this area. The seal can be formed as an O-ring, for example, but can also be molded directly onto the base body and/or the functional element as a sealing track made of thermoplastic elastomer.

The functional element is preferably at least partially formed of plastic. As a result, the functional element can be manufactured cost-effectively and in a wide variety of shapes. Preferably, the functional element is formed from an injection-moldable plastic, wherein the plastic is selected such that the functional element is dimensionally stable during the blow molding process. For this purpose, the plastic selected for the functional element preferably has a glass transition temperature that is above the temperature required for the blow molding process.

The functional element may form at least part of an adapter or form an adapter. The adapter, in turn, can be formed to accommodate one or more functional elements. The adapter can accommodate a wide variety of functional elements so that the base body can be flexibly equipped with functional elements. It is also conceivable to replace functional elements during operation.

The functional element may form at least part of a pump. For example, the functional element can be formed as a pump cover. If the functional element is formed as a pump cover, the pump housing is also mounted on the pump cover to complete the arrangement. Subsequently, the entire assembly can be installed. Alternatively, it is also conceivable that the functional element forms a section of a valve, for example a valve cover.

Alternatively, however, it is also conceivable that the functional element is formed as an adapter, valve, cooler, sensor, hose adapter or as a part of the aforementioned elements.

The functional element can have recesses into which the base body extends at least partially to form the positive connection. The recesses form part of a form-fit geometry and enable a positive connection between the base body and the functional element to be easily created. Preferably, the recesses form an undercut so that the creation of a positive connection is ensured.

The arrangement can form a distribution structure for temperature control media. Temperature control media are, for example, water-based cooling liquids. If the functional element is formed as a pump, the temperature control medium can be fed via the arrangement to various units whose temperatures are to be controlled. Units whose temperature is to be controlled can be, for example, accumulators, motors, power electronics, power computers or converters of electric vehicles.

In the method of producing an arrangement according to the disclosure, at least one functional element and a preform consisting of polymeric material are first provided and arranged in a blow mold, wherein the base body then is formed from the preform, wherein the preform bears against the functional element during forming to produce a bond. Preferably, the functional element is placed with the preform in such a way that the functional element is arranged outside the base body after completion of the blow molding process. The blow molding process preferably deforms the base body in such a way that a positive connection is created between the base body and the functional element, and the functional element is held on the base body in a loss-proof manner. Alternatively, or additionally, the base body can also bond with the functional element during blow molding.

Preferably, the preform extends at least partially into the recesses formed in the functional element during forming. Further preferably, during the forming process, the preform extends behind the undercut formed in the recesses. For this purpose, the preform can deform in the recesses during the forming process in such a way that an undercut is formed. The undercut ensures that the base body is positively locked to the functional element. For this purpose, the preform can expand like a mushroom head in the recesses, for example.

After blow molding, a flow-conducting connection can be made between the base body and the functional element. During blow molding, the preform bears against the functional element to produce the base body. In doing so, the base body initially covers the further flow channel of the functional element. To establish a flow-conducting connection, the base body can be opened in the area of the flow channel. For this purpose, a hole can be drilled in the wall of the base body, for example.

The functional element can be provided with a sealing element before blow molding, wherein the sealing element is preferably arranged in the area of the further flow channel. For example, a nozzle can be formed from the further flow channel, which is enclosed by the sealing element, for example an O-ring, in sections on the outer circumference. During the blow molding process, the preform bears against the nozzle of the further flow channel and also encloses the sealing element in the process. Due to the pressure applied during the blow molding process, the preform or the resulting base body bears against the sealing element with pretension so that a permanent sealing connection is produced. If an opening is later made in the base body to create a flow-conducting connection between the flow channel and a further flow channel, the sealing element ensures that no leakage can occur.

BRIEF DESCRIPTION OF THE DRAWINGS

Some embodiments of the arrangement according to the disclosure are explained in more detail with reference to the figures. These show, each schematically.

DETAILED DESCRIPTION

Figure 1:
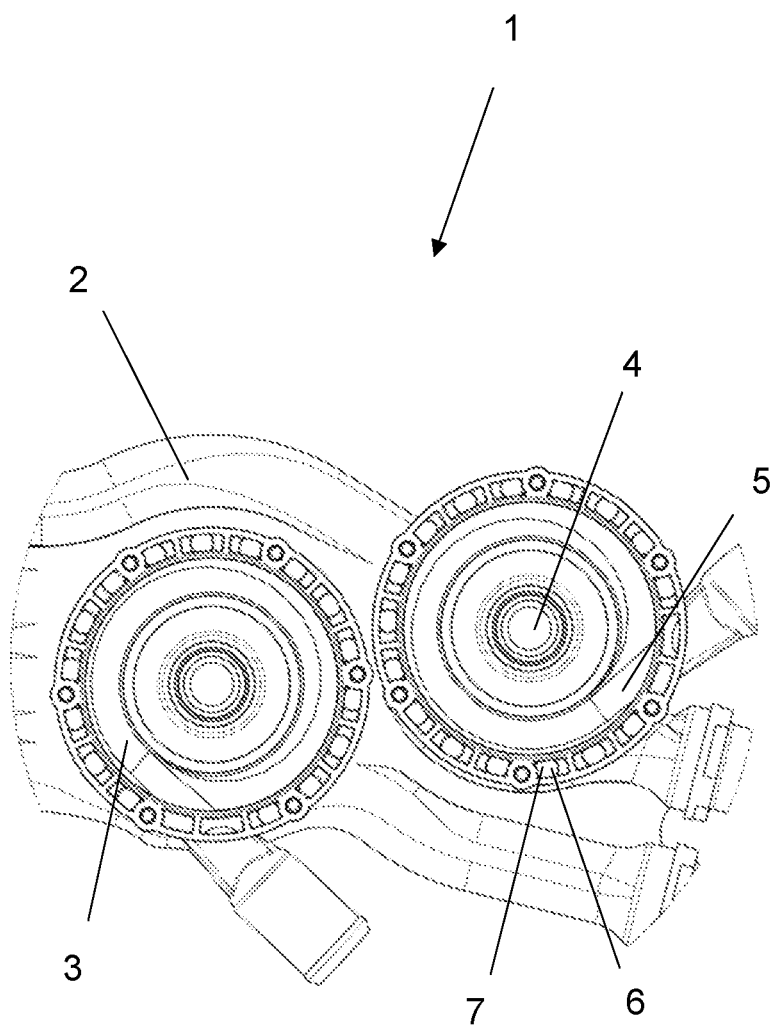
FIG. 1 an arrangement in top view.

The figures show an arrangement 1 for transporting media. In the present embodiment, the arrangement 1 is a distribution structure that forms part of a temperature control circuit of an electric vehicle. In this context, the arrangement 1 is used to transport and distribute temperature control media for controlling the temperature of elements of the electric vehicle whose temperatures are to be controlled, for example the batteries, the electric motors and the power electronics.

The arrangement 1 comprises a base body 2 formed as a blow-molded part and two functional elements 3, which are positively fixed to the base body 2.

The functional elements 3 are formed from injection-moldable plastic, wherein the glass transition temperature of the plastic selected for the functional elements 3 is above the temperature required for the blow molding process to produce the base body 2. In the present embodiment, the functional elements 3 form part of a pump, namely a pump cover.

In alternative embodiments, however, the functional element 3 may also be formed as an adapter, pump, cooler, sensor, valve, hose adapter, or may be formed as a part of the aforementioned elements.

The functional elements 3 are positively fixed to the base body 2. In this case, the positive fit is formed by deformation of the preform to produce the base body 2 during blow molding. The functional elements 3 have recesses 6, wherein the recesses 6 each form an undercut. The base body 2 extends into the recesses 6 to form the positive connection. In doing so, projections 7 are formed from the base body 2, which projections project into the recesses 6. The free ends of the projections 7 expand in the manner of mushroom heads, so that a loss-proof and positive connection is formed between the base body 2 and the functional elements 3. Alternatively, or additionally, the base body 2 can also form a substance-to-substance bond with the functional element 3 during blow molding.

To produce the arrangement, the functional elements 3 and a preform consisting of polymeric material are first provided and arranged in a blow mold. In the blow molding process, the base body 2 is formed from the preform, wherein the preform bears against the functional elements 3 during the forming process.

The base body 2 is made of plastic, wherein the glass transition temperature of the plastic selected for the base body 2 is below the glass transition temperature of the plastic selected for the functional elements 3.

To create the positive connection, the preform extends partially into the recesses 6 during the forming process. In the process, protrusions 7 are formed, which widen within the recesses 6 and expand behind the undercuts like mushroom heads.

FIG. 1 shows the arrangement 1 in top view. The two functional elements 3, each forming a pump cover, have an essentially circular basic shape. The recesses 6 are distributed around the circumference in the edge area of the functional elements 3. Projections 7 that are formed congruent with the recesses 6 are formed from the base body 2, wherein the projections 7 extend into the recesses 6.

The base body 2 has several flow channels 4. The functional elements 3 in turn each have a further flow channel 5. There is a flow-conducting connection between the base body 2 and the functional element 3, wherein one flow channel 4 opens into the further flow channel 5 of the functional elements 3 in each case.

Figure 2:
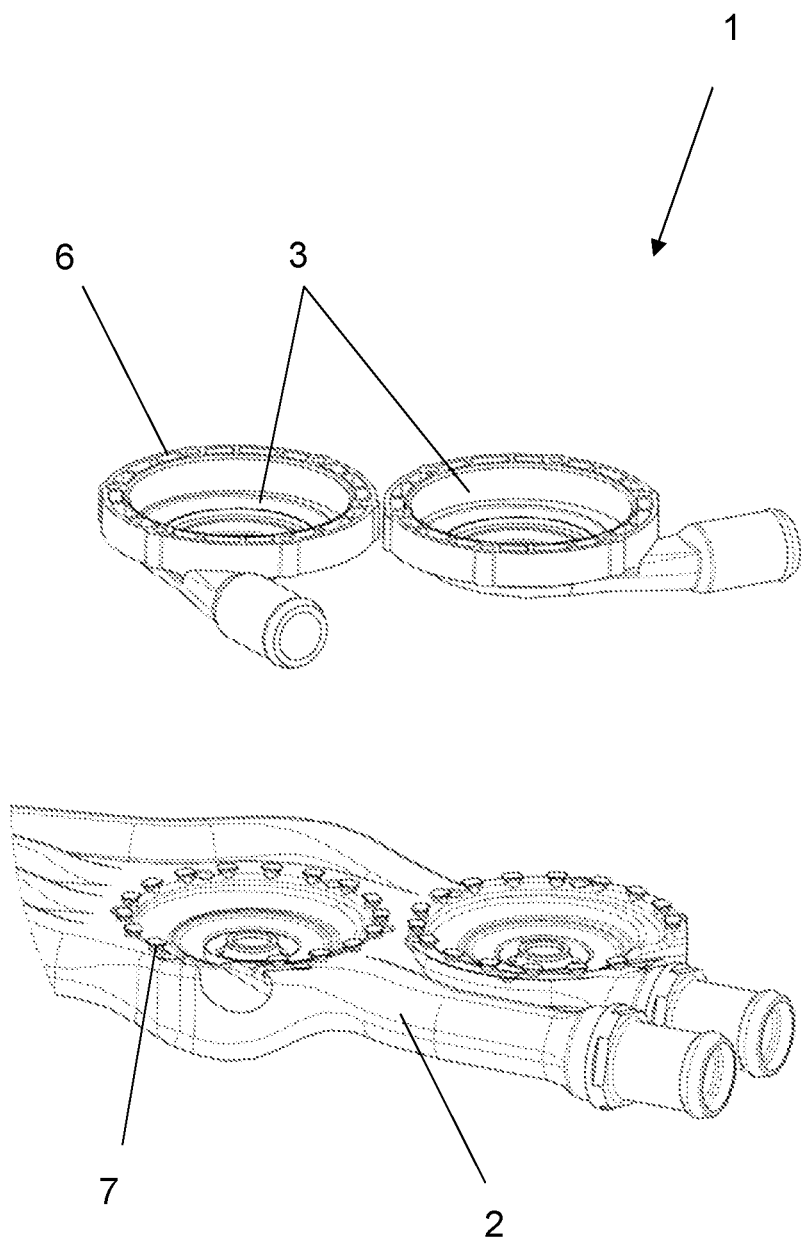
FIG. 2 the arrangement in exploded view.

FIG. 2 shows the arrangement 1 shown in FIG. 1 as an exploded view. It can be seen that the base body 2 is shaped congruently to the functional elements 3 in the area of the functional elements 3, which enables a particularly space-saving integration of the functional elements 3 in the base body 2. It can also be seen that the functional elements 3 have further flow channels 5 and supply lines belonging to the further flow channels 5, which are embedded in sections in the base body 2. The arrangement 1 is further equipped with further functional elements in the form of hose adapters, via which the integration of the arrangement 1 into the temperature control circuit of the electric vehicle takes place. The attachment of the base body 2 to the further functional elements has also been achieved by shaping the base body 2 during blow molding.

Figure 3:
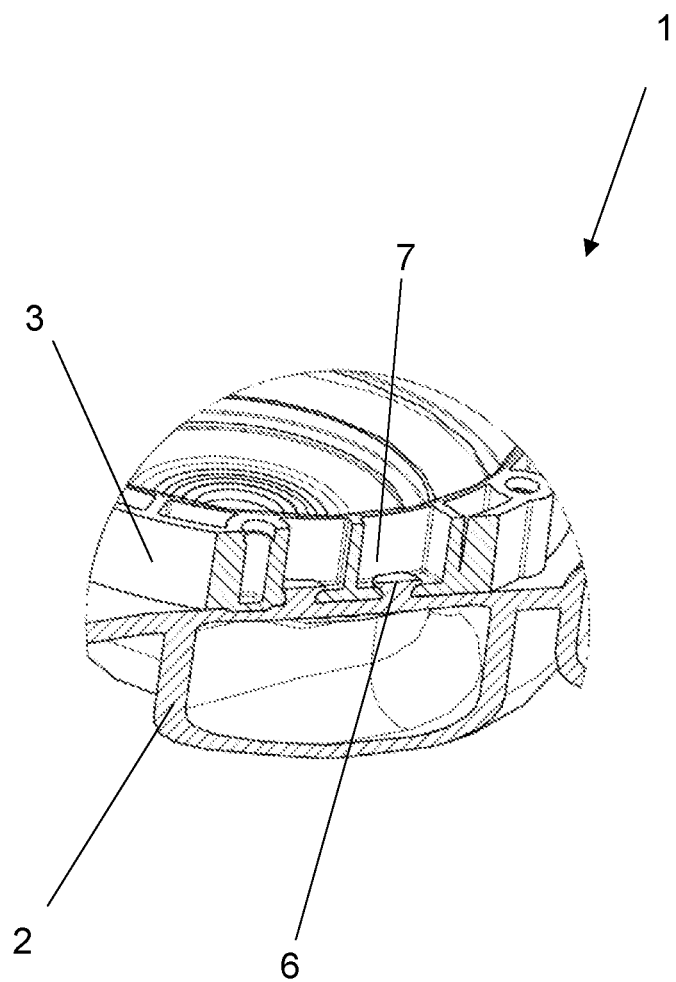
FIG. 3 in detail, the arrangement in the area of the recesses.

FIG. 3 shows in detail and in section the arrangement 1 in the area of the recesses 6.

Figure 4:
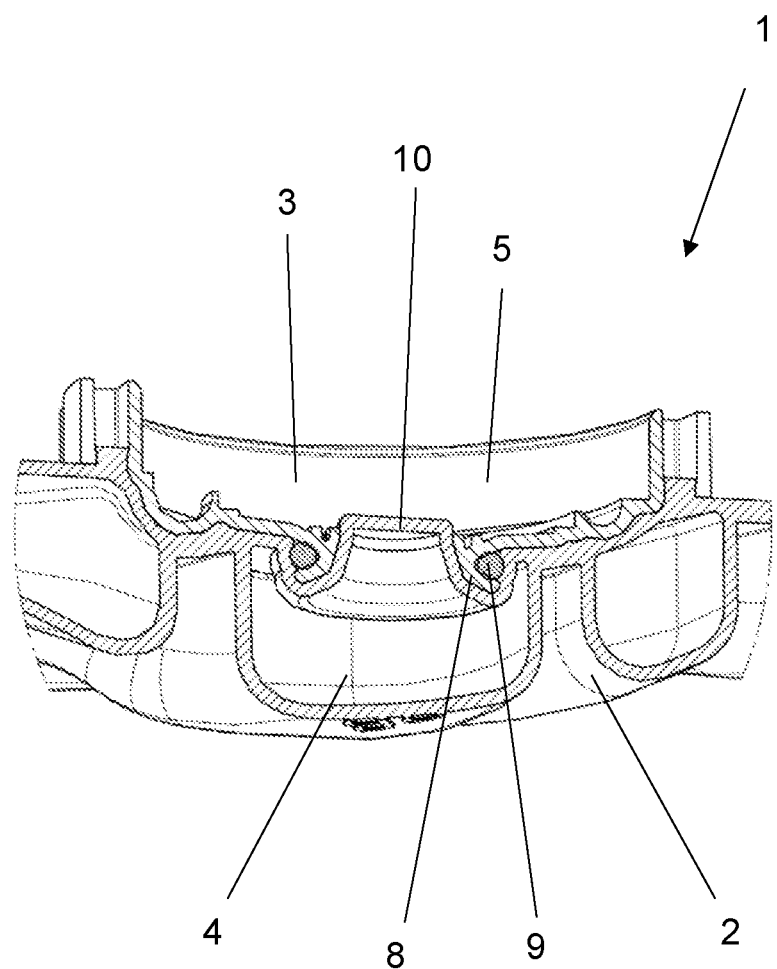
FIG. 4 in detail, the arrangement in the area of the flow channels.

FIG. 4 shows the arrangement 1 in detail in the area of the flow-conducting connection between the base body 2 and a functional element 3. The flow channel 4 of the base body 2 and the further flow channel 5 of the functional element 3 can be seen.

A nozzle 8 is formed from the further flow channel 5, onto which a seal 9 in the form of an O-ring is fitted on the outer circumference. During the blow molding process, the preform bears against the outside of the nozzle 8 and against the seal 9, and after completion of the blow molding process, the base body 2 bears against the seal 9 on the outside and with elastic pretension to form a seal.

FIG. 4 also shows that immediately after blow molding, the base body 2 blocks the flow-conducting connection between the flow channel 4 and the further flow channel 5. To establish the flow-conducting connection, the base body 2 is therefore opened in the area of the flow channels after completion of the blow molding process. This can be done, for example, by drilling a hole. In the process, the disk-shaped section 10 is at least partially removed.

Figure 5:
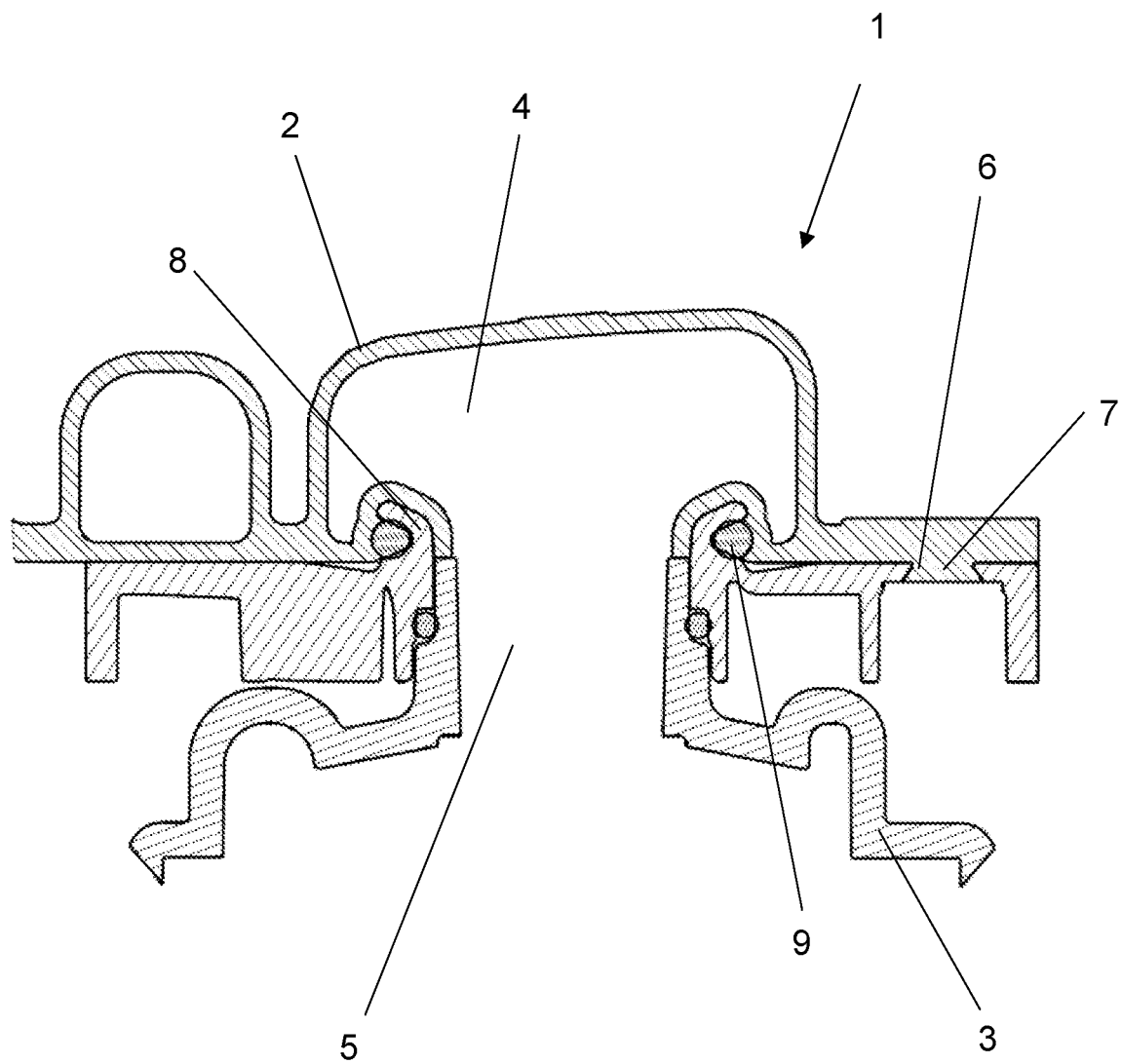
FIG. 5 another arrangement in section.

FIG. 5 shows another arrangement 1. The arrangement 1 shown here is substantially the same as the arrangement 1 shown previously. In this embodiment, however, the functional element 3 is formed as an adapter in the form of an adapter plate. The adapter plate is used to accommodate further functional elements, for example sensors, pumps, or valves.

The invention claimed is:

1. An arrangement for transporting media, comprising a base body formed as a blow-molded part and at least one functional element, wherein the functional element is fixed to the base body as a positive connection, wherein the connection between the base body and at least one functional element is formed by shaping the base body during blow molding, the functional element having an edge area having a plurality of recesses extending through the edge area to define a plurality of holes into which the base body extends at least partially to form the positive connection, wherein the base body comprises at least one flow channel and the plurality of recesses are arranged circumferentially about the flow channel.

2. The arrangement according to claim 1, wherein the connection of the base body and at least one functional element is a substance-to-substance bond.

3. The arrangement according to claim 1, wherein the functional element comprises at least one further flow channel.

4. The arrangement according to claim 1, wherein at least one flow-conducting connection exists between the base body and the functional element.

5. The arrangement according to claim 1, wherein the functional element is at least partially formed from plastic.

6. The arrangement according to claim 1, wherein the arrangement forms a distribution structure for temperature control media.

7. The arrangement according to claim 1, wherein the functional element is selected from the group consisting of an adapter, pump, cooler, sensor, valve or hose adapter.

8. The arrangement according to claim 1, wherein the recesses form an undercut.

9. The arrangement according to claim 1, wherein the base body comprises a first flow channel and the functional element comprises a second flow channel, and further comprising a seal fitted around the second flow channel and configured such that, upon blow molding the base body, the base body bears against the seal to elastically pretension the seal.

10. The arrangement according to claim 9, wherein the plurality of recesses into which the base body extends are located radially outward of the seal.

11. The arrangement according to claim 9, wherein the functional element defines a nozzle having the seal positioned around the nozzle.

12. The arrangement according to claim 1, wherein the base body extends through the plurality of holes and defines enlarged protrusions to form the positive connection.

13. The arrangement according to claim 1, wherein the flow channel defines an inlet having a nozzle with a seal fitted around an outer circumference of the nozzle and facing radially, and wherein the base body is formed to extend radially inwardly around the outer circumference and seal.

* * * * *